Patented Jan. 6, 1953

2,624,726

UNITED STATES PATENT OFFICE 2,624,726

COPOLYMERIZATION OF DIOLEFINS AND AROMATICS

George E. Serniuk, Roselle, N. J., assignor to Standard Oil Development Company, a corporation of Delaware No Drawing. Application December 2, 1949, Serial No. 130,847

18 Claims. (Cl. 260—94.2)

This invention relates to the manufacture of resinous masses and more particularly relates to the preparation of resins by the copolymerization of diolefins and aromatic hydrocarbons.

The reaction of conjugated dienes and aromatic hydrocarbons to form resinous bodies has been known for some time. See, for example, U. S. Patent No. 1,947,626 to Charles A. Thomas, and "Industrial and Engineering Chemistry," vol. 24, pages 1125–8 (1932). According to the method disclosed in these references, the resins are prepared by the application of solid aluminum chloride or other solid acid-acting halide catalyst to the hydrocarbon mixture at temperatures of 20° C. or above. However, the product is disclosed as containing a substantial amount of insoluble material. Furthermore, the process is limited to the use of substituted benzenes as the aromatic constituent, since benzene itself does not react under these conditions.

It has now been found that essentially gel-free (i. e. free from insoluble material) resinous polymers of varying softening point and degree of unsaturation can be prepared in high yield at fairly high catalyst efficiencies from diolefins and aromatic hydrocarbons, including benzene, by effecting the reaction at temperatures below 0° C. using a dissolved Friedel-Crafts type catalyst.

In carrying out this invention, various diolefins may be used with various aromatic hydrocarbons free from olefinic unsaturation. For example, very satisfactory results have been secured by using a diolefin, such as isoprene, with benzene, toluene, or the xylenes, or their homologues. Other aromatic hydrocarbons have been found to give good results, such as ortho, meta and para xylene, cymene (methyl isopropyl benzene), ethyl benzene, di-ethyl benzene, normal-propyl benzene and isopropyl benzene, tetra-methyl benzene, secondary butyl benzene, tertiary butyl benzene, amyl benzene, tertiary amyl benzene, hexa-methyl benzene, mesitylene, durene, isodurene, phenanthrene, enthracene, tetralin, hydrindene, as well as various petroleum and coal tar fractions containing these. Particuularly interesting resins are obtained when the aromatic hydrocarbon is substituted by one or more alkyl side chains containing a total of at least one, preferably at least three and up to six, carbon atoms. For example, ethyl-, diethyl-, and triethyl-benzene, alkylated naphthalene and durene give resins which posses excellent drying properties. Other conjugated diolefins of 4 to 6 carbon atoms may be used, such as the hexadienes, butadiene, di-methyl butadiene, methyl-pentadiene, cyclopentadiene, methylcyclopentadiene, as well as allo-ocimene, myrcene, etc.

When employing alkylated aromatics, such as toluene, xylene, etc., as the aromatic constituent, it may be desirable to carry out the process of the present invention in two steps, in the first of which an aromatic hydrocarbon is alkylated and, in the second, in which the product is copolymerized with the diolefin.

In the first step, an aromatic such as benzene, toluene, xylene, naphthalene, anthracene, etc., is mixed with a Friedel-Crafts catalyst such as $AlCl_3$, $AlBr_3$, $SnCl_4$, $ZnCl_2$, $BF_3$, etc., in a diluent such as methyl chloride, ethyl chloride, methylene chloride, ethylidene fluoride, etc., and to this is then added an olefin such as ethylene, propylene, butene, isobutene, amylene, or a mixture of olefins, such as are found in refinery streams of $C_4$ and $C_5$ cuts. The olefins are added to the system as rapidly as they can be reacted with the aromatic to form the alkyl aromatic. For example, benzene may be reacted with propylene to form mono, di, tri or tetra isopropyl benzene, or mixtures thereof. Toluene may be reacted with propylene to form mono- or poly-isopropyl toluene, etc. The alkylation of the aromatic by the olefin may also be accomplished in the presence of activated clays.

The second step consists of adding the desired amount of butadiene or other conjugated diene to the alkylated aromatic produced, mixing in a diluent system, and then adding additional catalyst ($AlCl_3$ in ethyl chloride) to effect a simultaneous alkylation and polymerization of the feed to polymer. The conjugated diene and alkylated aromatic can be polymerized in varying ratios, however, ratios of 50/50, 55/45, 60/40 and 65/35, 75/25, respectively, are preferred. In some instances it may be advantageous to separate specific alkylate cuts prior to the addition of the diene in order to obtain the desired physical properties. For example, it may be desired to use the di-alkyl aromatic in which case this material would be separated from any mono or higher substituted alkyl aromatic, and the mono-alkyl aromatic could be recycled for further alkylation.

The characteristics and yields of the resins that can be produced by this process are dependent upon the type of diene and aromatic, ratio of diene to aromatic in the feed, and the type and amount of catalyst employed, and the reaction temperature. By employing a major proportion of a diene and a minor proportion of an aromatic the resultant polymers are generally more unsaturated and the yields are higher than when the converse ratios are used. Thus the amount of diene combined in the product, and consequently the degree of polymer unsaturation can be varied by adjusting the ratio of diene to aromatic in the feed.

Resinous products with desirable properties can also be prepared by using a mixture of dienes and a single aromatic or a mixture of aromatics.

In practicing the invention the two components, i. e. the diolefin and the aromatic hydrocarbon, are mixed and cooled to temperatures below 0° C., e. g. about −10° C. to as low as −40° C. or −50° C. or even as low as −100° C. or −150° C.

The polymerization reaction is then conducted by the application of a dissolved Friedel-Crafts type catalyst, such as aluminum chloride, aluminum bromide, titanium tetrachloride, boron trifluoride, uranium chloride and the like, dissolved in a low-freezing, inert or non-complex forming solvent, such as ethyl or methyl chloride or carbon disulfide or the like. The catalyst solution contains from 0.1% to 5% or preferably 2 to 3.5% of the dissolved active metal halide catalyst and is preferably used in the ratio of about 10 parts per 100 parts of the diolefin. The polymerization proceeds promptly with the development of a substantial amount of heat and the production of a soluble polymer in the form of a solution.

By effecting the reaction in this manner, there are produced several products: (1) resinous polymer and (2) low molecular weight aromatic-diene alkylate. The amount of resin and alkylate produced is influenced by such factors as the amount of catalyst used, ratio of the conjugated diene to aromatic in the feed, and the structure of the aromatic. In general, by increasing the ratio of conjugated diene to aromatic increased polymer yields can be obtained. However, this increase in yield is governed by the structure of the aromatic employed. With aromatics such as benzene, toluene and xylene and similar alkyl benzenes, it is possible to obtain fair yields of polymer when reacted with butadiene in a high ratio. However, the resin yields pass through a maximum value for the respective aromatics and the remainder of the product formed being an aromatic-diene alkylate of low molecular weight.

In order to reduce the amount of low molecular weight alkylate formed, it may be desirable to introduce the diolefin incrementally to react with this alkylate. In this case the catalyst is also added incrementally. In this embodiment the initial feed consists of a major proportion of the aromatic and a minor proportion of the diene. For maximum resin yields, a diene to aromatic ratio of 60/40 is preferred, but with certain types of aromatics higher diolefin ratios give higher resin yields.

It may also, under certain circumstances, be desirable to isolate the alkyl aromatic and then react it with the diolefin under the same conditions used in the original reaction. These alkyl aromatics generally distill over at a temperature range of 130° C. at atmospheric pressure to 196 to 200° C. at 5 mm. of mercury. The product can therefore be distilled under these conditions and then reacted with more diolefin.

The following examples are set forth to illustrate the types of products that can be obtained by the process of this invention.

EXAMPLE I

Polymers of butadiene and benzene were prepared from varying feed ratios of butadiene and benzene in the following manner: a 5-liter 3-way flask, fitted with an air driven mechanical stirrer, Dry-Ice cooled reflux condenser, thermometer and catalyst delivery funnel, was charged with methyl chloride (amount of methyl chloride equaled one-half of total volume of reactants) and the desired amounts of butadiene and benzene (total weight was generally 750° g.). The mixture of butadiene, benzene and methyl chloride was then agitated until an equilibrium temperature was reached. Aluminum chloride (anhydrous) dissolved in ethyl chloride (concentration of $AlCl_3$ was generally 2 to 3.5 g./100 cc. ethyl chloride) was then added in increments to the reaction charge.

The rate at which the catalyst solution was added was governed by the activity of the reaction. The amount of catalyst that was delivered was based on the observation of a diminished reactivity and volume of reflux of the methyl chloride. When a diminished reactivity was observed a 15 minute contact period was allowed following the addition of the last portion of catalyst solution. The catalyst was then quenched with a mixture of isopropyl alcohol and water. The methyl and ethyl chlorides were allowed to weather off by allowing the polymer solution to stand at room temperature. The polymer solution was then freed of catalyst residues by washing with water. The polymer was isolated from unreacted materials by heating to 450° F. No gel or insoluble product was obtained.

The following data were obtained:

TABLE I

*Butadiene-benzene polymers*

| Experiment No. | A | B | C | D | E | F | G |
|---|---|---|---|---|---|---|---|
| Butadiene, g. | 150 | 225 | 300 | 375 | 450 | 525 | 600. |
| Benzene, g. | 600 | 525 | 450 | 375 | 300 | 225 | 150. |
| Ratio | 20/80 | 30/70 | 40/60 | 50/50 | 60/40 | 70/30 | 80/20. |
| Diluent: | | | | | | | |
| Type | MeCl | MeCl | MeCl | MeCl | MeCl | MeCl | MeCl. |
| Vol., c. c. | 552 | 552 | 552 | 552 | 552 | 552 | 552. |
| Percent total feed vol. | 60.5 | 58.5 | 56.5 | 55 | 53 | 52 | 51. |
| Catalyst: | | | | | | | |
| Type | $AlCl_3$ | $AlCl_3$ | $AlCl_3$ | $AlCl_3$ | $AlCl_3$ | $AlCl_3$ | $AlCl_3$. |
| Solvent | EtCl | EtCl | EtCl | EtCl | EtCl | EtCl | EtCl. |
| Conc., g./100 cc. | 3.12 | 3.12 | 3.12 | 3.12 | 2.04 | 2.04 | 2.04. |
| Solution used, cc. | 300 | 400 | 300 | 145 | 125 | 100 | 65. |
| G. | 9.36 | 12.48 | 9.36 | 4.52 | 2.55 | 2.04 | 1.33. |
| Percent on feed | 1.250 | 1.66 | 1.25 | 0.62 | 0.34 | 0.272 | 0.177. |
| Efficiency | 19.9 | 20.4 | 35 | 61.5 | 99 | 99.5 | 105. |
| Reaction: | | | | | | | |
| Time, min. | 90 | 90 | 70 | 52 | 51 | 89 | 27. |
| Temp., °C. | −10 to −7.5 | −12 to −9 | −14 to −10.5 | −15 to −13 | −15.5 to −13 | −13 to −17 | −18 to −12. |
| Recovery: | | | | | | | |
| Product, g. | 186 | 255 | 326 | 278 | 253 | 203 | 140. |
| Yield, percent on total | 25 | 34 | 44 | 37 | 34 | 27 | 19. |
| Yield, percent on diene | 124 | 113 | 109 | 74 | 56 | 38.6 | 23.3. |
| Product: | | | | | | | |
| State | Soft | Hard | S | S | S | S | S. |
| Color | Amber | Amber | | | | | |
| Soft. pt., °C. | 58 | 90 | | | | | |
| Iodine No. | 79.2 | 85.8 | | | | | |

S—polymer retained in solution.

EXAMPLE 2

Polymers of butadiene and toluene were prepared according to Example 1 and the following data were obtained:

TABLE II
*Butadiene-toluene polymers*

| Experiment No. | A | B | C | D | E | F | G | H |
|---|---|---|---|---|---|---|---|---|
| Butadiene, g | 150 | 225 | 300 | 375 | 450 | 525 | 600 | 675. |
| Toluene, g | 600 | 525 | 450 | 375 | 300 | 225 | 150 | 75. |
| Ratio | 20/80 | 30/70 | 40/60 | 50/50 | 60/40 | 70/30 | 80/20 | 90/10. |
| Diluent: | | | | | | | | |
| Type | MeCl | MeCl | MeCl | MeCl | MeCl | MeCl | MeCl | MeCl. |
| Vol., cc | 552 | 552 | 552 | 552 | 552 | 552 | 552 | 552 |
| Percent total feed vol | 60 | 58 | 56 | 55 | 53 | 50 | 50 | 49. |
| Catalyst: | | | | | | | | |
| Type | $AlCl_3$ | $AlCl_3$ | $AlCl_3$ | $AlCl_3$ | $AlCl_3$ | $AlCl_3$ | $AlCl_3$ | $AlCl_3$. |
| Solvent | EtCl | EtCl | EtCl | EtCl | EtCl | EtCl | EtCl | EtCl. |
| Conc., g./100 cc | 3.76 | 3.76 | 2.12 | 3.28 | 3.28 | 3.28 | 3.28 | 2.72 |
| Sol. used, cc | 775 | 900 | 690 | 800 | 500 | 250 | 140 | 85. |
| G | 29.2 | 33.8 | 14.60 | 26.2 | 16.40 | 8.20 | 4.60 | 2.31. |
| Percent on feed | 3.88 | 4.5 | 1.95 | 3.5 | 2.18 | 1.09 | 0.61 | 0.308. |
| Efficiency | 10 | 12.5 | 26 | 21 | 31 | 52 | 84 | 110. |
| Reaction: | | | | | | | | |
| Time, min | 90 | 105 | 60 | 90 | 75 | 75 | 60 | 48. |
| Temp., °C | −8 | −10 | −11 | −12 | −14 | −14 | −15 | −13. |
| Recovery: | | | | | | | | |
| Product, g | 301 | 421 | 381 | 538 | 503 | 428 | 385 | 256. |
| Yield, percent on total | 41 | 56 | 51 | 72 | 67 | 57 | 51 | 34. |
| Yield, percent on diene | 201 | 187 | 127 | 143 | 112 | 82 | 64 | 38. |
| Product: | | | | | | | | |
| State | S | H | S | S | S | S | S | S. |
| Color | A | A | L. A. | A | L. A. | A | L. A. | L. A. |
| Soft. pt., °C | 33 | 65 | 16 | 41 | 41 | 36 | | |
| Iodine No | 21.4 | 25.6 | 111.9 | 103.3 | 141.8 | 172.4 | | |

S—soft; H—hard; A—amber; L. A.—light amber.

EXAMPLE 3

Polymers of butadiene and xylene were prepared according to the process of Example 1 and the following data obtained:

TABLE III
*Butadiene-xylene polymers*

| Experiment No. | A | B | C | D | E | F | G |
|---|---|---|---|---|---|---|---|
| Butadiene, g | 150 | 225 | 300 | 375 | 450 | 525 | 600. |
| Xylene, g | 600 | 525 | 450 | 375 | 300 | 225 | 150. |
| Ratio | 20/80 | 30/70 | 40/60 | 50/50 | 60/40 | 70/30 | 80/20. |
| Diluent: | | | | | | | |
| Type | MeCl | MeCl | MeCl | MeCl | MeCl | MeCl | MeCl. |
| Vol., cc | 552 | 552 | 552 | 552 | 552 | 552 | 552. |
| Percent total feed vol | 60 | 58.5 | 56.5 | 55 | 53 | 52 | 50. |
| Catalyst: | | | | | | | |
| Type | $AlCl_3$ | $AlCl_3$ | $AlCl_3$ | $AlCl_3$ | $AlCl_3$ | $AlCl_3$ | $AlCl_3$ |
| Solvent | EtCl | EtCl | EtCl | EtCl | EtCl | EtCl | EtCl. |
| Conc., g./100 cc | 2.84 | 2.84 | 2.84 | 3.16 | 3.16 | 3.36 | 3.36. |
| Sol. used, cc | 350 | 600 | 700 | 700 | 800 | 400 | 175. |
| G | 9.94 | 17.04 | 19.88 | 22.12 | 25.28 | 13.44 | 5.88 |
| Percent on feed | 1.33 | 2.27 | 2.65 | 2.94 | 3.37 | 1.79 | 0.785. |
| Efficiency | 26.7 | 21.8 | 19.7 | 23.4 | 23.1 | 45.5 | 75.5. |
| Reaction: | | | | | | | |
| Time, min | 55 | 95 | 90 | 115 | 125 | 115 | 78. |
| Temp., °C | −12 | −13 | −13 | −14 | −17.5 | −15 | −15. |
| Recovery: | | | | | | | |
| Product, g | 266 | 371 | 391 | 516 | 584 | 611 | 444. |
| Yield, percent on total | 35.4 | 49.5 | 52 | 69 | 78 | 82 | 59. |
| Yield, percent on diene | 177 | 165 | 130 | 138 | 130 | 116 | 74. |
| Product: | | | | | | | |
| State | F | F | F | F | S. S. | S. S. | S. S. |
| Color | D. A. | R | R | R | L | L | L. |
| Iodine No | 83.9 | 99.7 | 130.9 | 143 | 1,629 | 174 | |

F—fluid; S. S.—semi-solid; D. A.—dark amber; R—reddish; L—light

EXAMPLE 4

Polymers of butadiene and ethyl, diethyl and triethyl benzene were prepared according to the process of Example 1 and the following data were obtained:

TABLE IV
*Butadiene-ethylated benzene polymer*

| Experiment No | A | B | C | D | E | F | G |
|---|---|---|---|---|---|---|---|
| Butadiene, g | 40 | 40 | 40 | 160 | 100 | 100 | 100. |
| Ethylbenzene, g | 160 | | | | 100 | | |
| Diethylbenzene, g | | 160 | | | | 100 | |
| Triethylbenzene, g | | | 160 | 40 | | | 100. |
| Ratio | 20/80 | 20/80 | 20/80 | 80/20 | 50/50 | 50/50 | 50/50. |
| Diluent: | | | | | | | |
| Type | MeCl | MeCl | MeCl | MeCl | MeCl | MeCl | MeCl. |
| Volume, cc | 150 | 150 | 150 | 150 | 150 | 150 | 150. |
| Percent total feed vol | 61 | 60 | 61 | 51 | 56 | 56 | 56. |
| Catalyst: | | | | | | | |
| Type | $AlCl_3$ | $AlCl_3$ | $AlCl_3$ | $AlCl_3$ | $AlCl_3$ | $AlCl_3$ | $AlCl_3$. |
| Solvent | EtCl | EtCl | EtCl | EtCl | EtCl | EtCl | EtCl. |
| Conc., g/100 cc | 3.78 | 4.13 | 3.47 | 3.47 | 3.78 | 4.13 | 3.47. |
| Sol. used, cc | 200 | 200 | 150 | 50 | 300 | 200 | 200. |
| g | 7.56 | 8.26 | 520 | 1.735 | 11.34 | 8.26 | 6.94. |
| Cat. on feed, percent | 3.78 | 4.13 | 2.60 | 0.868 | 5.67 | 4.13 | 3.47. |
| Efficiency | 11.1 | 12 | 16.9 | 40.4 | 12.5 | 19.2 | 19.2. |
| Reaction: | | | | | | | |
| Time, min | 40 | 45 | 35 | 28 | 50 | 60 | 42. |
| Temp., °C | −12 to −6. | −14 to −6. | −14 | −14 | −12 to −6. | −14 to −12. | −16. |
| Recovery: | | | | | | | |
| Product, g | 83.7 | 98.8 | 88 | 70.1 | 142.3 | 159 | 133. |
| Conv., percent | 41.8 | 49.4 | 44 | 35 | 71.1 | 79.5 | 66.5. |
| Product: | | | | | | | |
| State | V. F. | V. F. | V. F. | S. S. | Hard | | Hard. |
| Color | R. | R. | A. | A. | D. A. | A. | A. |
| Iodine No | 38.5 | 57.3 | 41.7 | 263.8 | 9.35 | 51 | 90. |

V. F.—viscous fluid; S. S.—semi-solid; R—reddish; A—amber; D. A.—dark amber.

EXAMPLE 5

Polymers of butadiene and naphthalene were prepared according to the process of Example 1 and the following data were obtained:

*Butadiene-naphthalene polymer*

TABLE V
*Butadiene-naphthalene polymer*

| Experiment No | A | B | C |
|---|---|---|---|
| Butadiene, g | 375 | 450 | 525. |
| Naphthalene, g | 375 | 300 | 225. |
| Ratio | 50/50 | 60/40 | 70/30. |
| Diluent: | | | |
| Type | MeCl | MeCl | MeCl. |
| Vol., cc | 552 | 552 | 552. |
| Percent total feed vol | 61 | 58 | 55. |
| Catalyst: | | | |
| Type | $AlCl_3$ | $AlCl_3$ | $AlCl_3$. |
| Solvent | EtCl | EtCl | EtCl. |
| Conc., g/100 cc | 4.88 | 3.84 | 3.52. |
| Sol. used, cc | 1,000 | 1,000 | 700. |
| g | 48.8 | 38.4 | 24.64. |
| Percent on feed | 6.45 | 5.1 | 3.28. |
| Efficiency | 12.8 | 17.7 | 33.4. |
| Reaction: | | | |
| Time, min | 100 | 105 | 78. |
| Temp., °C | −16 to −12 | −16 to −11 | −16 to −14. |
| Recovery: | | | |
| Product, g | 625 | 681 | 576. |
| Conv., percent | 84 | 91 | 77. |
| Product: | | | |
| State | Hard | Hard | Soft. |
| Color | Dark | Dark | Amber. |
| Soft. Pt., °C | 80 | 96 | 65.5. |

EXAMPLE 6

The procedure described in Example 1 was used to prepare polymers from butadiene and a 90% pure durene. The results are tabulated below:

TABLE VI
*Butadiene-durene polymers*

| Experiment No | A | B | C | D |
|---|---|---|---|---|
| Butadiene, g | 250 | 300 | 350 | 450. |
| Durene, g | 250 | 200 | 150 | 300. |
| Ratio | 50/50 | 60/40 | 70/30 | 60/40. |
| Diluent: | | | | |
| Type | MeCl | MeCl | MeCl | MeCl. |
| Vol., cc | 368 | 368 | 368 | 600. |
| Percent total feed vol | 53 | 52 | 50 | |
| Catalyst: | | | | |
| Type | $AlCl_3$ | $AlCl_3$ | $AlCl_3$ | $AlCl_3$. |
| Solvent | EtCl | EtCl | EtCl | EtCl. |
| Conc., g/100 cc | 3.28 | 3.28 | 2.44 | 3.34. |
| Sol. used, cc | 500 | 400 | 500 | |
| g | 16.40 | 13.12 | 12.20 | |
| Percent on feed | 3.28 | 2.63 | 2.44 | |
| Efficiency | 27.3 | 37.2 | 37.6 | |
| Reaction: | | | | |
| Time, min | 80 | 91 | 90 | 90. |
| Temp., °C | −17.5 to −13.5 | −17 to −15.5 | −17 to −14 | −15. |
| Recovery: | | | | |
| Polymer, g | 447 | 490 | 459 | 700. |
| Conv., percent | 89 | 98 | 92 | 93.5. |
| Product: | | | | |
| State | Soft | Soft | Soft | 78.5° C. |
| Color | Amber | Reddish | Amber | Amber. |
| Iodine No | 149 | 146.7 | 163 | 136.8. |

EXAMPLE 7

A polymer of 1,3-butadiene and benzene was prepared in the following manner: A 5-liter 3-way round bottom flask fitted with a mechanical stirrer, Dry-Ice cooled reflux condenser, thermometer and catalyst delivery funnel was charged with 552 cc. of methyl chloride, 338 g. of benzene and 114 g. of 1,3-butadiene. The materials were well agitated and when equilibrium temperature was reached AlCl₃ catalyst dissolved in ethyl chloride, concentration of 3.6 g. AlCl₃/100 cc. ethyl chloride, was added in increments. Three hundred grams of 1,3-butadiene were added in three equal portions at various times during the course of the polymerization as indicated by the log of the reaction given below:

| Time | Temp., °C. | Vol. cat. sol., cc. | Remarks |
|---|---|---|---|
| 0:00:00 | −13.5 | 50 | Reactive, foamy, reflux, color change to dark reddish, vigorous reflux upon adding catalyst. |
| 0:04:25 | −13.0 | | |
| 0:05:00 | | 100 | |
| 0:09:15 | −13.0 | | |
| 0:15:00 | | | 100 g. 1,3-butadiene added, foamy, reflux, reactive, dark red color, still active reflux. |
| 0:20:00 | | 150 | |
| 0:23:25 | −12.0 | | |
| 0:25:00 | | 200 | |
| 0:26:55 | −12.0 | | |
| 0:30:00 | | | 100 g. 1-3-butadiene added, foamy, reactive, darker color. |
| 0:35:00 | | 250 | |
| 0:38:05 | −11.0 | | |
| 0:39:00 | | 300 | Vigorous reflux, reactive, some viscosity build up. |
| 0:40:50 | −11.0 | | |
| 0:45:00 | | | 100 g. 1,3-butadiene added, reactive, foamy, viscous, dark color. |
| 0:50:00 | | 350 | |
| 0:53:10 | −10.5 | | |
| 0:57:30 | | | Catalyst quenched with 100 cc. of methanol, 1,000 cc. 54° naphtha added. |

The polymer solution was allowed to stand at room temperature to weather off methyl and ethyl chlorides. The reactor solution was poured gradually into a large volume of 99% isopropyl alcohol whereupon the polymer precipitated out as a resinous body. The polymer was freed of moisture and solvents by heating at 85° C. in a vacuum oven. There were obtained 355.5 grams of a light colored, brittle resin which corresponds to a 47% conversion. A similar reaction effected with all of the butadiene added initially resulted in a 35.5% conversion to soft polymer.

EXAMPLE 8

A 5-liter 3-way flask fitted with a mechanical stirrer, Dry Ice cooled reflux condenser, catalyst delivery tube and thermometer was charged with the following: toluene, 500 g.; 1,3-butadiene, 500 g.; methyl chloride, 750 cc. To the above was delivered 1075 cc. of an ethyl chloride solution of anhydrous aluminum chloride containing 3.76 g. of AlCl₃/100 cc. of solution over a period of one hour and fifty minutes. After two hours and five minutes the catalyst was quenched with methanol (150 cc.). The methyl and ethyl chlorides were flashed off and the resin solubilized in n-heptane. The catalyst residues were removed by water washing. Solvents were stripped under desk vacuum. The unreacted materials were removed by distillation at 5 m. m. p. at a bottoms temperature of 260° C. There were recovered 681 g. of a clear, light colored, soluble resin possessing a ball and ring softening point of 100° C., and an iodine number of 88.

EXAMPLE 9

Equipment described in Example 8 was charged with the following: xylene, 500 g.; 1,3-butadiene, 500 g.; methyl chloride 740 cc. To the above was delivered over a period of one hour and fifty minutes a total of 810 cc. of an ethyl chloride solution of anhydrous aluminum chloride containing 372 g. of AlCl₃/100 cc. of solution. The reaction mixture was then allowed to stand over night without quenching the catalyst. On the following day the reaction mixture was heated in a water bath at 80° C. for 4 hours thereby distilling off methyl and ethyl chlorides. The reaction product was solubilized in n-heptane, and the catalyst quenched with 150 cc. of methanol. The product henceforth was isolated in the manner disclosed in Example 8. There were recovered 795 g. of clear, dark amber colored, soluble resin possessing an iodine number of 72 and a ball and ring softening point of 123° C.

EXAMPLE 10

Attempts to prepare a completely soluble, high melting point resin, by the technique disclosed in the prior art, resulted in a low conversion of the feed to a product consisting of a minor proportion of a soluble polymer and a major proportion of a gel or insoluble polymer. Thus, when solid, finely divided (200 mesh) anhydrous aluminum chloride (41 g.) was gradually dusted into a feed consisting of xylene, 500 g.; 1,3-butadiene, 500 g.; n-hexane, 500 g.; a reaction took place yielding a soluble and insoluble polymer. The insoluble polymer was deposited on the wall of the reactor. After isolation in the manner described in Example 8 there were obtained 117 g. of a light colored, fluid polymer and an insoluble polymer amounting to 200 g. The soluble product showed an iodine number of 186.

EXAMPLE 11

A 5-liter 3-way flask fitted with a mechanical stirrer, Dry-Ice cooled reflux condenser, thermometer and catalyst delivery funnel was charged with the following: methyl chloride, 740 cc.; 1,3-butadiene, 500 g.; toluene, 500 g. The charge was agitated until equilibrium temperature was reached. An ethyl chloride solution of anhydrous aluminum chloride, containing 3.4 g. aluminum chloride/100 cc., was added in increments to the reaction charge. A total of 1177 cc. of catalyst solution, equivalent to 40 g. of aluminum chloride, was added over a period of one hour and fifty minutes. At the end of two hours the catalyst was quenched by the addition of 150 cc. of methanol. The solution was allowed to stand to weather off methyl and ethyl chlorides. The product was diluted with petroleum ether. The alkenyl aromatics and resin were isolated in the following manner: The entire solution was subjected to a distillation in which the petroleum ether was taken off at a vapor temperature of 75° C., and following this the fractions listed below were collected:

1st fraction, B. P. 75–115° C., 140 g.
2nd fraction, B. P. 115–135° C., 45 g.
3rd fraction, B. P. 80–90° C. (5 m. m. p.), 58.9 g.
4th fraction, B. P. 95–140° C. (5 m. m. p.), 26.6 g.
5th fraction, B. P. 140–187° C (5 m. m. p.), 25.3 g.
Toluene and alkenyl aromatics, 296 g.

or 29.6% based on the feed. Resin obtained as residue of distillation—670 g. or 67% conversion based on the feed.

Two such runs were made from which a total of 596 g. of toluene and alkenyl aromatics with the above boiling range were collected.

EXAMPLE 12

The recovered toluene and alkenyl aromatics described in Example 11 were reacted with a fresh charge of butadiene. The apparatus was the same as that described in Example 11 and the charge was as follows: methyl chloride, 740 cc.; 1,3-butadiene, 500 g.; recovered toluene and alkenyl aromatics described in Example 11, 500 g.

To the above was added in increments a total of 1112 cc. of an ethyl chloride solution of aluminum chloride, concentration 3.6 g. aluminum chloride/100 cc. ethyl chloride over a period of one hour and 54 minutes. At the end of two hours and 10 minutes the catalyst was quenched with 150 cc. of methanol. The polymer recovery was the same as described in Example 11. A total of 590 g. of a clear, light colored, hard, brittle resin was obtained. It is clear from this experiment that the recovered aromatics and alkenyl aromatics described in Example 11 can be reacted with additional butadiene to produce a useful resin by employing the same reaction conditions used in the preparation of the resin described in Example 11.

EXAMPLE 13

Alkenyl aromatics of the type described in Example 11 do not necessarily have to be produced by the reaction therein described. Alkenyl aromatics of this type can be deliberately prepared by reacting a 1,3-diene and an aromatic in the presence of an ethyl ether or beta, beta-prime-dichloro ethyl ether complex of aluminum chloride. The preparation of alkenyl aromatics is described below. The apparatus of Example 11 was charged with the following: toluene, 920 g.; 1,3-butadiene, 108 g. To the above was added in increments over a period of one hour and thirty-two minutes a complex formed between 66 g. of aluminum chloride and 74 g. of anhydrous ethyl ether. As the final portion of the catalyst was added the reaction became quite exothermic. At the end of the exothermic reaction the catalyst was quenched with 150 cc. of methanol. The catalyst residues were removed by water washing. The solution was dried over sodium sulfate and filtered. The filtrate was then subjected to distillation and the following fractions were collected:

1st fraction, B. P. 130–140° C., 60.6 g. or 22.2%
2nd fraction, B. P. 140–180° C., 9.1 g. or 3.3%
3rd fraction, B. P. 180–205° C., 17.4 g. or 6.4%
4th fraction, B. P. 170–190° C., 95.5 g. or 35.0%, desk vac.
5th fraction, B. P. 110–196° C., 39.4 g. or 14.4%, 5 m. m. p.
Residue, B. P. 196° C. at 5 m. m. p., 59.7 g. or 18.6%.

All of the above fractions rapidly decolorized an acetone solution of $KMnO_4$. The above fractions of alkenyl aromatics show almost the same boiling range as those isolated from the resin reaction described in Example 11. The above fractions of alkenyl aromatics singly or combined or admixed with alkylated aromatics are equally well suited for reacting with additional 1,3-dienes to form resins according to the procedure described in Example 12.

EXAMPLE 14

Polymers of butadiene and aromatic petroleum fractions were prepared in the equipment of Example 8 from varying feed ratios using methyl chloride diluent and a catalyst consisting of aluminum chloride dissolved in ethyl chloride. The following data were obtained:

TABLE VII

| Aromatic | Polymer synthesis | | | | | Polymer properties | | |
|---|---|---|---|---|---|---|---|---|
| | Ratio $C_4H_6$/Ar | Reaction temp., °C. | Catalyst, percent on feed | Catalyst efficiency | Polymer conv., percent | Color | Softening pt., °C. | Iodine No. |
| Aromatic fraction, B. P., 157–185° C | 50/50 | −15 to −12 | 2.16 | 33.2 | 72 | Amber | Soft | 156.5 |
| | 55/45 | −15 to −13.5 | 1.728 | 41.8 | 72 | do | do | 176.3 |
| | 60/40 | −16 to −14 | 1.78 | 48.7 | 86 | do | do | 189.5 |
| | 40/60 | −15 to 12.5 | 1.52 | 40.5 | 61.5 | do | do | 156.7 |
| Aromatic fraction, B. P., 192–203° C | 50/50 | −15 to 12.5 | 3.33 | 22.2 | 74 | do | 19 | 170.9 |
| | 60/40 | −14 to −12 | 2.56 | 31.1 | 80 | do | 51 | 189.3 |
| | 70/30 | −14 to −13 | 1.28 | 39.4 | 51 | do | | |
| | 80/20 | −15 | 0.8 | 54.3 | 43.5 | do | | |
| Aromatic fraction, B. P., 195–189° C | 50/50 | −15 | 1.56 | 31.6 | 49.5 | Light | 51 | 156.2 |
| | 55/45 | −16 to −14 | 2.23 | 29.7 | 66.2 | do | 70 | 151.3 |
| | 60/40 | −15 to −13 | 2.21 | 34.4 | 76.5 | do | 77 | 153.8 |
| | 50/50 | −15 to 13.5 | 2.35 | 24.7 | 58 | Amber | 66.5 | 156.2 |
| Isodurene fraction | 55/45 | −15.5 to −13 | 2.35 | 28.2 | 66 | do | 74 | 155 |
| | 60/40 | −15.5 to −14 | 2.35 | 33.6 | 79 | do | 76 | 161.8 |
| Prehnitene fraction | 55/45 | −13 to −11 | 2.88 | 22.9 | 66 | do | 77 | 155 |
| | 60/40 | −15 to −11 | 2.4 | 28.6 | 68.5 | do | 79.5 | 164.9 |

The resins prepared in accordance with the invention are found to have an amber to reddish color and to find application in the surface coating field, either as such, or after reacting with natural drying oils, in printing inks, rust preventatives, can coatings, leather treatment, rubber plasticizers, etc. In making the coating material the resin is placed with the desired drying oil or combination of oils in a suitable vessel and heated to 250 to 565° F. The heating is continued until the combination of oil or oils and resin have acquired a satisfactory "body" or degree of consistency. This is judged by the appearance and by other characteristics and tests generally employed in the bodying step in varnish making. For a mixture of about 100 g. about one hour is required for heating, when the usual "body" is desired; but the exact time of heating will vary with the volume of the mix, the nature of the resin and the oil and the consistency desired. The properly heated mixture is allowed to cool, then thinned with a varnish thinner such as mineral spirits, to obtain the desired viscosity. Instead of varnish thinners, cheap thinners, such as gasoline or naphtha, may be used, as this resin, as well as the reaction product of this resin and oil, have the unusual property of being sufficiently soluble in relatively cheap solvents, such as gasoline or naphtha, to produce a coating material or varnish of proper consistency for application as a protective coating.

The coating material described, with or without pigments or metallic driers, and using a usual paint or varnish solvent or a relatively cheap thinner, such as gasoline, produces a film which, when baked at 120° C. for one hour, is relatively insoluble in gasoline and paint and varnish solvents. That is, the film remains unaffected by immersion in gasoline or other organic solvents for one hour or longer. When the film is air dried at room temperature for several days, it likewise becomes relatively insoluble in gasoline and other organic solvents in the manner described above. The film thus formed is also impervious to water and very resistant to acids and alkalies.

The dried film produced from this coating material made from a reaction product of the described resin with a drying oil, has also the very desirable property of high elasticity or flexibility. That is, the film will withstand a high degree of stress and shock without cracking, peeling, chipping or otherwise being injured. This property of high flexibility characterizes the novel reaction product of the described resin with a drying oil.

The following examples are illustrative of the type of films and coatings obtained by the process of this invention.

EXAMPLE 15

The resins obtained in Examples 1–6 were reacted with alkali refined linseed oil to give a 15 gallon length varnish. The varnishes were diluted with naphtha, conventional driers added, and panels were prepared. The air dried and baked film properties were then evaluated and the results shown in the following tables.

TABLE VIII

*Butadiene-benzene polymer-linseed oil varnishes*

| Experiment No. | A | B | C | D | E | F | G |
|---|---|---|---|---|---|---|---|
| Resin: | | | | | | | |
| $C_4H_6/C_6H_6$ ratio in feed | 20/80 | 30/70 | 40/60 | 50/50 | 60/40 | 70/30 | 80/20. |
| Percent diene in product | 72 | 73.5 | 89 | 84 | 96.5 | | |
| Varnish preparation: | | | | | | | |
| Cook time, hrs.: min | 6:21 | 4:25 | (a) | (a) | (a) | (a) | (a). |
| Cook temp., °F | 565 | 565 | 350 | 250 | 280 | 500 | 400. |
| Base loss, percent | 13.6 | 10.6 | 0 | | | | |
| Thinner | Naphtha | Naphtha | Naphtha | Naphtha | Naphtha | Naphtha | Naphtha. |
| Gardner: | | | | | | | |
| Color | 13–14 | 11–12 | 4–5 | | | 5–6 | |
| Vis | U–V | U–V | E | | (c) | (c) | (c). |
| Reduced cure | 10 | 9 | 48 | (b) | | 112 | 87. |
| Air dried film d: | | | | | | | |
| Hardness | 2 | 2 | 2 | | 2 | 3 | 3. |
| Water resistance | 4 | 0 | 5 | | 8 | 6 | 7. |
| Grease resistance | 6 | 5 | 7 | | 4 | 7 | 4. |
| Alkali resistance | 4 | 0 | 8 | | 9 | 9 | 9. |
| Flex resistance | 0 | 0 | 0 | | 0 | 0 | 0. |
| Soap resistance | 4 | 5 | 9 | | 7 | 8 | 7. |
| Baked film d: | | | | | | | |
| Hardness | 0 | 2 | 0 | | 0 | 0 | 3. |
| Water resistance | 0 | 0 | 0 | | 0 | 0 | 0. |
| Grease resistance | 0 | 0 | 0 | | 0 | 0 | 0. |
| Alkali resistance | 3 | 2 | 2 | | 5 | 3 | 6. |
| Flex resistance | 0 | 0 | 0 | | 0 | 0 | 0. |
| Soap resistance | 2 | 1 | 0 | | 3 | 1 | 4. | a Time required to reach cook temp. indicated, ca. ½ hour.
b Complete gel. Panels could not be prepared.
c Varnish was stringy and gelatinous.
d 0-unaffected, 9-film failure.

TABLE IX

*Butadiene-toluene polymer-linseed oil varnishes*

| Experiment No. | A | B | C | D | E | F | G | H |
|---|---|---|---|---|---|---|---|---|
| Resin: | | | | | | | | |
| $C_4H_6/C_6H_5CH_3$ ratio in feed | 20/80 | 30/70 | 40/60 | 50/50 | 60/40 | 70/30 | 80/20 | 90/10. |
| Percent diene in product | 48 | 57 | 57.5 | 65 | 71 | 69.5 | 92.5 | |
| Varnish preparation: | | | | | | | | |
| Cook time, hrs.: min | 5:00 | 5:35 | 4:45 | 2:40 | 4:05 | 2:18 | 5:30a | 4:00. |
| Percent base loss | 24.2 | 18.2 | 21.2 | 15.2 | 10.1 | 9.1 | | |
| Thinner | Naphtha | Naphtha | Naphtha | Naphtha | Naphtha | Naphtha | Naphtha | Naphtha. |
| Gardner: | | | | | | | | |
| Color | 16–17 | 16–17 | 16–17 | 15–16 | 11–12 | 10–11 | 10–11 | 10–11. |
| Viscosity | P–Q | S | U–V | X | U | X | K–L | K–L. |
| Air dried film b: | | | | | | | | |
| Hardness | 0 | 0 | 0 | 3 | 0 | 0 | 3 | 2. |
| Water resistance | 0 | 0 | 0 | 0 | 1 | 0 | 2 | 2. |
| Grease resistance | 6 | 3 | 0 | 1 | 0 | 0 | 3 | 0. |
| Caustic resistance | 7 | 0 | 0 | 0 | 0 | 0 | 8 | 9. |
| Flex resistance | 0 | 0 | 0 | 0 | 0 | 0 | 0 | 0. |
| Soap resistance | 3 | 0 | 0 | 0 | 0 | 0 | 7 | 2. |
| Baked film b: | | | | | | | | |
| Hardness | 0 | 0 | 0 | 0 | 0 | 0 | 0 | 0. |
| Water resistance | 0 | 0 | 0 | 0 | 0 | 0 | 0 | 0. |
| Grease resistance | 3 | 2 | 0 | 0 | 0 | 0 | 0 | 0. |
| Caustic resistance | 0 | 0 | 0 | 1 | 0 | 3 | 5 | 4. |
| Flex resistance | 0 | 0 | 0 | 0 | 0 | 0 | 0 | 0. |
| Soap resistance | 0 | 0 | 4 | 0 | 0 | 1 | 0 | 0. | a Varnish cook temp. was 500°F. Others were 565°F.
b 0—film unaffected; 9—film failure.

TABLE X
*Butadiene-xylene polymer-linseed oil varnishes*

| Experiment No | A | B | C | D | E | F | G |
|---|---|---|---|---|---|---|---|
| Resin: | | | | | | | |
| $C_4H_6/C_6H_4(CH_3)_2$ ratio in feed | 20/80 | 30/70 | 40/60 | 50/50 | 60/40 | 70/30 | 80/20. |
| Percent diene in product | 54 | 49 | 60 | 71 | 76 | 80 | 90. |
| Varnish preparation: | | | | | | | |
| Cook time, hrs.:min | 5:37 | 7:50 | 6:45 | 4:00 | 4:42 | 3:40 | 1:22. |
| Percent base loss | | 24.2 | 24.2 | 10.6 | 16.7 | 9.1 | 3.7. |
| Thinner | Naphtha | Naphtha | Naphtha | Naphtha | Naphtha | Naphtha | Naphtha. |
| Gardner: | | | | | | | |
| Color | | 12–13 | 13–14 | 12–13 | 10–11 | 9–10 | 5–6. |
| Viscosity | (a) | S–T | U–V | W–X | W–X | U–V | I. |
| Air dried film [b]: | | | | | | | |
| Hardness | | 1 | 0 | 3 | 2 | 0 | T. S. |
| Water resistance | | 0 | 0 | 0 | 0 | 7 | |
| Grease resistance | | 6 | 7 | 0 | 0 | 6 | |
| Caustic resistance | | 2 | 4 | 6 | 6 | 7 | |
| Flex resistance | | 0 | 0 | 0 | 0 | 0 | |
| Soap resistance | | 0 | 5 | 6 | 5 | 8 | |
| Baked film [b]: | | | | | | | |
| Hardness | | 3 | 0 | 3 | 0 | 0 | 0. |
| Water resistance | | 0 | 0 | 0 | 0 | 0 | 0. |
| Grease resistance | | 0 | 0 | 0 | 0 | 0 | 2. |
| Caustic resistance | | 0 | 0 | 3 | 4 | 1 | 2. |
| Flex resistance | | 0 | 0 | 0 | 0 | 0 | 0. |
| Soap resistance | | 3 | 3 | 3 | 4 | 2 | 0. | a Varnish gelled.
b 0—film unaffected; 9—film failure.
T. S.—film was too soft.

TABLE XI
*Butadiene and ethylated benzenes-linseed oil varnishes*

| Experiment No | E | F | G |
|---|---|---|---|
| Varnish preparation: | | | |
| Cook time, hrs.: min | 3:00 | 3:27 | 4:40 |
| Base loss, percent | 13.2 | 12.6 | 11.5 |
| Thinner | Naphtha | Naphtha | Naphtha |
| Gardner: | | | |
| Color | 13 | 11–12 | 11–12 |
| Viscosity | U–V | U–V | V–W |
| Reduced cure | 26 | 18 | 15 |
| Air dried film [a]: | | | |
| Hardness | 0 | 3 | 0. |
| Water resistance | 0 | 0 | 0. |
| Grease resistance | 0 | 0 | 0. |
| Caustic resistance | 4 | 2 | 5. |
| Flex resistance | 0 | 0 | 0. |
| Soap resistance | 1 | 2 | 6. | a 0—film unaffected; 9—film failure.

TABLE XIII
*Butadiene-naphthalene polymers—Summary of linseed oil varnish film properties*

| Experiment No | A | B | C |
|---|---|---|---|
| Resin—$C_4H_6/C_{10}H_8$ ratio in feed | 50/50 | 60/40 | 70/30. |
| Varnish preparation: | | | |
| Oil type | ARLO | ARLO | ARLO. |
| Length, gals | 15 | 15 | 15. |
| Cook time, hrs.: min | 3:10 | 2:28 | 2:10. |
| Base loss, percent | 13.7 | 9.1 | 9.1. |
| Thinner | Naphtha | Naphtha | Naphtha. |
| Gardner: | | | |
| Color | 17–18 | 16 | 12–13. |
| Viscosity | V | R | U. |
| Reduced cure | 14 | 36 | 23. |
| Air dried film [a]: | | | |
| Hardness | 1 | 0 | 0. |
| Water resistance | 8 | 0 | 0. |
| Grease resistance | 7 | 7 | 0. |
| Caustic resistance | 7 | 8 | 7. |
| Flex resistance | 0 | 0 | 0. |
| Soap resistance | 7 | 0 | 7. |
| Baked film [a]: | | | |
| Hardness | 0 | 0 | 0. |
| Water resistance | 0 | 0 | 0. |
| Grease resistance | 7 | 0 | 0. |
| Caustic resistance | 0 | 0 | 0. |
| Flex resistance | 0 | 0 | 0. |
| Soap resistance | 4 | 0 | 4. | a 0—Film unaffected; 9—film failure.

TABLE XII
*Film property ratings of ethyl, diethyl and triethylbenzene-butadiene polymers*

| Experiment No. | Samples | Film air dried, 2½ days | | | | | | Film air dried, 11½ to 12 days | | | | | | Baked film | | | | | |
|---|---|---|---|---|---|---|---|---|---|---|---|---|---|---|---|---|---|---|---|
| | | W | G | S | C | H | F | T | W | G | S | C | H | F | T | W | G | S | C | H | F | T |
| A | $C_4H_6$/EtPh ratio 20/80 | 0 | 9 | 0 | 0 | 1 | 0 | 3 | 4 | 9 | 0 | 0 | 0 | 0 | 4 | 0 | 9 | 1 | 1 | 0 | 4 | 3 |
| B | $C_4H_6$/Et2Ph ratio 20/80 | 0 | 9 | 0 | 0 | 2 | 0 | 5 | 1 | 9 | 7 | 0 | 1 | 0 | 5 | 0 | 9 | 9 | 0 | 0 | 3 | 2 |
| C | $C_4H_6$/Et3Ph ratio 20/80 | Film still tacky after 11 days | | | | | | | | | | | | | | | | | | | | |
| D | $C_4H_6$/Et3Ph ratio 80/20 | 0 | 1 | 0 | 1 | 0 | 4 | 0 | 4 | 0 | 4 | 7 | 0 | 0 | 0 | 6 | 0 | 6 | 4 | 0 | 3 | 0 |

W—water; G—grease; S—soap; C—caustic; H—hardness; F—flex; T—tack.

TABLE XIV

*Summary of air dried and baked film properties of linseed oil varnishes of butadiene-durene polymers*

| Experiment No. | A | B | C | D |
|---|---|---|---|---|
| Resin—Ratio diene/durene in feed | 50/50 | 60/40 | 70/30 | 60/40 |
| Varnish preparation: | | | | |
| Oil type | ARLO | ARLO | ARLO | ARLO |
| Length, gals | 15 | 15 | 15 | |
| Cook time, hrs.:min | 6:32 | 4:42 | 3:48 | |
| Base loss, percent | 31 | 21.2 | 14.5 | |
| Thinner | Naphtha | Naphtha | Naphtha | Naphtha |
| Gardner: | | | | |
| Color | 13 | 11–12 | 10–11 | 10–11 |
| Viscosity | T | P–Q | L | M |
| Reduced cure | 26 | 52 | 46 | 45 |
| Air dried film a: | | | | |
| Hardness | 0 | 0 | 0 | 0 |
| Water resistance | 3 | 0 | 0 | 0 |
| Grease resistance | 1 | 0 | 0 | 0 |
| Caustic resistance | 0 | 0 | 0 | 0 |
| Flex resistance | 0 | 0 | 0 | 0 |
| Soap resistance | 8 | 0 | 0 | 0 |
| Baked film a: | | | | |
| Hardness | 0 | 0 | 0 | 0 |
| Water resistance | 0 | 0 | 0 | 0 |
| Grease resistance | 0 | 0 | 0 | 0 |
| Caustic resistance | 0 | 4 | 1 | 0 |
| Flex resistance | 0 | 0 | 0 | 0 |
| Soap resistance | 0 | 0 | 0 | 0 | a 0—Film unaffected; 9—Film failure.

EXAMPLE 16

The resins obtained in Examples 11 and 12 were cooked with alkali refined linseed oil and the resulting varnishes were found to have the following evaluations:

TABLE XV

| Experiment No. | Example 11 | Example 12 |
|---|---|---|
| Varnish prep.: | | |
| Cook time, hrs.:min | 4:23 | 4:27 |
| Base loss, percent | 13.6 | 6.7 |
| Thinner | Naphtha | Naphtha |
| Gardner: | | |
| Color | 12–13 | 10–11 |
| Viscosity | T–U | M–N |
| Reduced cure | 22 | 33 |
| Air dried film: | | |
| Hardness | 0 | 0 |
| H$_2$O | 0 | 5 |
| Grease | 2 | 5 |
| NaOH | 3 | 4 |
| Flex | 0 | 0 |
| Soap | 1 | 4 |
| Tack | 9 | 0 |
| Baked film: | | |
| Hardness | 0 | 0 |
| H$_2$O | 0 | 0 |
| Grease | 0 | 0 |
| NaOH | 0 | 0 |
| Flex | 0 | 0 |
| Soap | 0 | 0 |
| Tack | 0 | 0 |

The resins obtained in Example 14 were cooked with alkali refined linseed oil and the resulting varnishes were found to have the following evaluations:

TABLE XVI

| Varnish preparation | | | | | Varnish film properties | | | | | | | | | | | | | |
|---|---|---|---|---|---|---|---|---|---|---|---|---|---|---|---|---|---|---|
| Cook time, hrs.:min | Base loss, percent | Gardner | | Red. cure, secs. | Air dried film a | | | | | | | Baked film a | | | | | | |
| | | Color | Visc. | | H | W | G | C | F | S | T | H | W | G | C | F | S | T |
| 7:22 | 21.8 | 11–12 | U–V | 27 | 0 | 0 | 4 | 0 | 0 | 2 | 2 | 0 | 0 | 0 | 1 | 0 | 0 | 0 |
| 5:10 | 18.2 | 11 | X | 22 | 1 | 4 | 0 | 0 | 0 | 3 | 2 | 2 | 0 | 0 | 5 | 0 | 4 | 0 |
| 5:42 | 18.2 | 10–11 | S | 30 | 0 | 4 | 0 | 0 | 0 | 2 | 2 | 0 | 0 | 0 | 0 | 0 | 0 | 0 |
| 5:42 | 33.3 | 14–15 | U–V | 25 | 1 | 3 | 3 | 0 | 0 | 5 | 0 | 0 | 0 | 0 | 0 | 0 | 0 | 0 |
| 6:05 | 21.2 | 13–14 | R–S | 40 | 1 | 0 | 4 | 3 | 0 | 1 | 0 | 0 | 0 | 0 | 0 | 0 | 0 | 0 |
| 5:06 | 13.6 | 11–12 | N | 38 | 2 | 2 | 0 | 7 | 0 | 3 | 0 | 0 | 0 | 0 | 0 | 0 | 0 | 0 |
| 2:15 | | 9–10 | U | 71 | 1 | 5 | 2 | 4 | 0 | 5 | 0 | 0 | 0 | 0 | 0 | 0 | 0 | 0 |
| 0:10 | | 7–8 | I | 91 | 1 | 5 | 0 | 4 | 9 | 9 | 0 | 0 | 0 | 0 | 1 | 0 | 0 | 0 |
| 7:10 | 13 | 12–13 | R–S | 36 | 0 | 0 | 0 | 9 | 6 | 2 | 0 | 0 | 0 | 0 | 2 | 0 | 0 | 0 |
| 7:13 | 13.6 | 12–13 | T–U | 40 | 0 | 0 | 0 | 0 | 6 | 2 | 0 | 0 | 0 | 0 | 2 | 0 | 0 | 0 |
| 6:28 | 10.9 | 10–11 | T–U | 36 | 0 | 0 | 4 | 0 | 9 | 6 | 0 | 0 | 0 | 0 | 0 | 0 | 0 | 0 |
| 6:45 | 13.6 | 13–14 | T | 41 | 0 | 3 | 1 | 0 | 3 | 1 | 1 | 0 | 0 | 0 | 7 | 0 | 0 | 0 |
| 6:03 | 11.5 | 12 | R–S | 39 | 0 | 0 | 0 | 0 | 5 | 2 | 1 | 0 | 0 | 0 | 0 | 0 | 0 | 0 |
| 4:57 | 10.6 | 10–11 | P | 41 | 0 | 3 | 0 | 0 | 5 | 4 | 1 | 0 | 0 | 0 | 0 | 0 | 0 | 0 |
| 6:54 | 9.1 | 12–13 | I–J | 89 | 0 | 1 | 1 | 0 | 2 | 4 | 0 | 0 | 0 | 0 | 0 | 0 | 0 | 0 |
| 3:32 | 7.57 | 11–12 | U–V | 38 | 0 | 1 | 0 | 0 | 2 | 5 | 0 | 0 | 0 | 0 | 0 | 0 | 0 | 0 |

The nature of the present invention having thus been described, what is claimed as new and useful and desired to be secured by Letters Patent is:

1. A process of preparing a synthetic resin which comprises mixing a major proportion of a benzene hydrocarbon free from olefinic unsaturation with a minor proportion of a conjugated diolefin of 4 to 6 carbon atoms, cooling the mixture to a temperature between 0° C. and −40° C., at that temperature gradually adding to the mixture a solution of aluminum chloride dissolved in a low freezing, inert, non-complex forming solvent in a concentration between about 2 and 3.5 g./100 cc., also adding to the reaction mixture additional diolefin incrementally during the course of the reaction until the ratio of total diolefin to aromatic hydrocarbon reaches a value between 50/50 and 75/25, and separating the resulting hard resin from the reaction mixture.

2. A process according to claim 1 wherein the benzene hydrocarbon is toluene.

3. A process of preparing a synthetic resin which comprises mixing a conjugated diolefin of 4 to 6 carbon atoms with an aromatic hydrocarbon having 1 to 4 alkyl radicals as the sole substituents which contain a total of 1 to 6 carbon atoms in a ratio between 50/50 and 75/25 at a temperature between about −10° C. and −40° C. and at that temperature adding to the mixture a solution of aluminum chloride dissolved in an alkyl chloride of 1 to 2 carbon atoms in a concentration between 0.1 and 5% to form a solid resin.

4. A process according to claim 3 wherein the aromatic hydrocarbon is durene.

5. A process of preparing a synthetic resin which comprises mixing butadiene-1,3 and toluene in a weight ratio between 50/50 and 60/40 in the presence of an alkyl chloride reaction diluent having 1 to 2 carbon atoms per molecule, cooling the mixture to a temperature between about −10° C. and −40° C., at that temperature gradually adding to the mixture a solution of aluminum chloride dissolved in an alkyl chloride of 1 to 2 carbon atoms in a concentration between about 2 and 5%, quenching the residual catalyst with an alcohol at a conversion level between 51 and 72% based on total hydrocarbon reactants, driving off the alkyl chloride, removing the quenched catalyst residues from a solution of the resin by washing with water and removing unreacted reagents by vacuum stripping at a temperature below about 260° C.

6. A process according to claim 5 wherein the alkyl chloride diluent is present in an amount equal to about one half the total volume of hydrocarbon reactants.

7. A method for preparing a synthetic resin which comprises reacting a conjugated diolefin of 4 to 6 carbon atoms with an aromatic hydrocarbon free from olefinic unsaturation in a ratio between 50/50 and 75/25 at a temperature below 0° C. in the presence of a Friedel-Crafts type catalyst dissolved in a low freezing, inert, non-complex forming solvent in a concentration between about 0.1 and 5%.

8. Process according to claim 7 in which the aromatic hydrocarbon contains at least two alkyl side chains.

9. Process according to claim 8 in which the alkyl side chains of the aromatic hydrocarbon contain a total of at least 3 carbon atoms.

10. Process according to claim 7 in which the aromatic hydrocarbon is a naphthalene hydrocarbon.

11. Process according to claim 7 in which the aromatic hydrocarbon is an ethyl benzene.

12. Process according to claim 7 in which the aromatic hydrocarbon is durene.

13. A method of preparing a synthetic resin which comprises reacting a conjugated diolefin of 4 to 6 carbon atoms with an aromatic hydrocarbon selected from the group consisting of benzene, toluene, the xylenes, the ethyl benzenes, naphthalene, and durene in a ratio between 50/50 and 75/25 at a temperature below 0° C. in the presence of a Friedel-Crafts type catalyst dissolved in a low freezing, inert, non-complex forming solvent in a concentration between about 0.1 and 5%.

14. A process of preparing a synthetic resin which comprises mixing butadiene-1,3 and an aromatic hydrocarbon selected from the group consisting of benzene, toluene, the xylenes, the ethyl benzenes, naphthalene, and durene in a weight ratio between 50/50 and 60/40 in the presence of an alkyl chloride reaction diluent having 1 to 2 carbon atoms per molecule, cooling the mixture to a temperature between about −10° C. and −40° C., at that temperature gradually adding to the mixture a solution of aluminum chloride dissolved in an alkyl chloride of 1 to 2 carbon atoms in a concentration between about 2 and 5%, quenching the residual catalyst with an alcohol at a conversion level between 51 and 72% based on total hydrocarbon reactants, driving off the alkyl chloride, removing the quenched catalyst residues from a solution of the resin by washing with water and removing unreacted reagents by vacuum stripping at a temperature below about 26° C.

15. Process according to claim 14 in which the aromatic hydrocarbon is benzene.

16. Process according to claim 14 in which the aromatic hydrocarbon is naphthalene.

17. Process according to claim 14 in which the aromatic hydrocarbon is durene.

18. Process according to claim 14 in which the aromatic hydrocarbon is a xylene.

GEORGE E. SERNIUK.

REFERENCES CITED

The following references are of record in the file of this patent:

UNITED STATES PATENTS

| Number | Name | Date |
|---|---|---|
| 1,947,626 | Thomas | Feb. 20, 1934 |
| 2,317,842 | Wolfram et al. | Apr. 27, 1943 |
| 2,476,000 | Sparks et al. | July 12, 1949 |

FOREIGN PATENTS

| Number | Country | Date |
|---|---|---|
| 516,931 | Great Britain | Jan. 16, 1940 |
| 583,481 | Great Britain | Dec. 19, 1946 |